United States Patent
Stanley

(10) Patent No.: US 10,209,075 B2
(45) Date of Patent: Feb. 19, 2019

(54) ORIENTATION DETERMINATION FOR DEVICES GENERATING ELECTROMAGNETIC INTERFERENCE

(71) Applicant: FREESCALE SEMICONDUCTOR, INC., Austin, TX (US)

(72) Inventor: Michael E. Stanley, Mesa, AZ (US)

(73) Assignee: NXP USA, Inc., Austin, TX (US)

(*) Notice: Subject to any disclaimer, the term of this patent is extended or adjusted under 35 U.S.C. 154(b) by 920 days.

(21) Appl. No.: 14/502,393

(22) Filed: Sep. 30, 2014

(65) Prior Publication Data
US 2016/0094766 A1    Mar. 31, 2016

(51) Int. Cl.
  *G01C 21/16* (2006.01)
  *G01P 15/18* (2013.01)
  *G01P 21/00* (2006.01)

(52) U.S. Cl.
  CPC .......... *G01C 21/165* (2013.01); *G01P 15/18* (2013.01); *G01P 21/00* (2013.01)

(58) Field of Classification Search
  CPC ......... G01B 7/30; G01C 19/00; G01C 21/165
  See application file for complete search history.

(56) References Cited

U.S. PATENT DOCUMENTS

| | | | |
|---|---|---|---|
| 8,976,270 B2* | 3/2015 | Nonaka | G06F 1/1626 345/173 |
| 2010/0017124 A1* | 1/2010 | Zhao | G01C 21/165 701/455 |
| 2011/0066395 A1 | 3/2011 | Judd | |
| 2011/0106474 A1 | 5/2011 | Kulik et al. | |
| 2011/0241656 A1 | 10/2011 | Piemonte et al. | |
| 2012/0173143 A1* | 7/2012 | Belenkii | G01C 17/34 701/513 |
| 2013/0111991 A1* | 5/2013 | Takizawa | G01C 19/5747 73/504.12 |
| 2014/0202229 A1 | 7/2014 | Stanley | |

* cited by examiner

*Primary Examiner* — Mohamed Charioui

(57) ABSTRACT

A mechanism is provided to determine orientation of a device that includes sources of electromagnetic interference. Data generated by one or more gyroscopes in the device, in conjunction with data generated by one or more accelerometers, can be used to generate an estimate of the change of orientation of the device from the time of a last accurate magnetometer reading. In one embodiment, in order to conserve system power, the gyroscope is kept powered down or in a stand-by state until receiving a control signal to power up. The control signal is provided in advance of the source of electromagnetic interference being powered up, thereby providing an accurate starting point from which magnetometer orientation estimates may be calculated during such interference.

20 Claims, 7 Drawing Sheets

ORIENTATION DETERMINATION FOR DEVICES GENERATING ELECTROMAGNETIC INTERFERENCE

BACKGROUND

Field

This disclosure relates generally to sensor devices, and more specifically, to using data from accelerometer, gyroscope and magnetometer sensors to determine orientation of a device that produces electromagnetic interference.

Related Art

Recent trends in consumer electronic devices include addition of a variety of magnetic and inertial sensors in portable devices. These sensors include accelerometers to measure device acceleration or gravity, magnetometers to measure magnetic field, and gyroscopes to determine rotational movement. Inclusion and intelligent use of multiple types of sensors has been called "sensor fusion."

In certain types of applications, knowledge of the orientation of a device with respect to a global frame of reference can be useful. For example, digital still cameras can use both global positioning system (GPS) data and compass orientation data to aid in determining location of and heading towards the subject of a photograph. Compass orientation information can be typically determined by a magnetometer in conjunction with accelerometer readings, but if electromagnetic interference is present, the data provided by the magnetometer can be incorrect. In the case of a digital still camera, electromagnetic interference can be generated by a motor housed within the camera, such as, for example, a lens focusing motor. It is therefore desirable to determine compass orientation data in a manner that compensates for such interference.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism to determine orientation of a device that includes sources of electromagnetic interference. Data generated by one or more gyroscopes in the device, in conjunction with data generated by one or more accelerometers, can be used to generate an estimate of the change of orientation of the device from the time of the last accurate magnetometer reading. In one embodiment, in order to conserve system power, the gyroscope is kept powered down or in a stand-by state until receiving a control signal to power up. The control signal is provided in advance of the source of electromagnetic interference generating the electromagnetic interference, thereby providing an accurate starting point from which magnetometer orientation estimates may be calculated during such interference.

Certain electronic device applications benefit from knowing an orientation of the electronic device with regard to a global frame of reference. Such orientations can be especially useful, for example, in digital camera applications in which the orientation coupled with global positioning system (GPS) coordinates can be used to determine where the photographer is located and in which direction the camera is facing when the photo is taken. Typically, an orientation of a device with regard to a global frame of reference, such as magnetic north, will be determined using a magnetometer sensor coupled with an accelerometer. But magnetometers can be rendered inaccurate or disabled by electromagnetic interference (EMI) generated by, for example, electric motors in the electronic device. In the case of a digital camera, for example, a lens focus motor activated when a picture is taken can be the source of such EMI.

Figure 1:
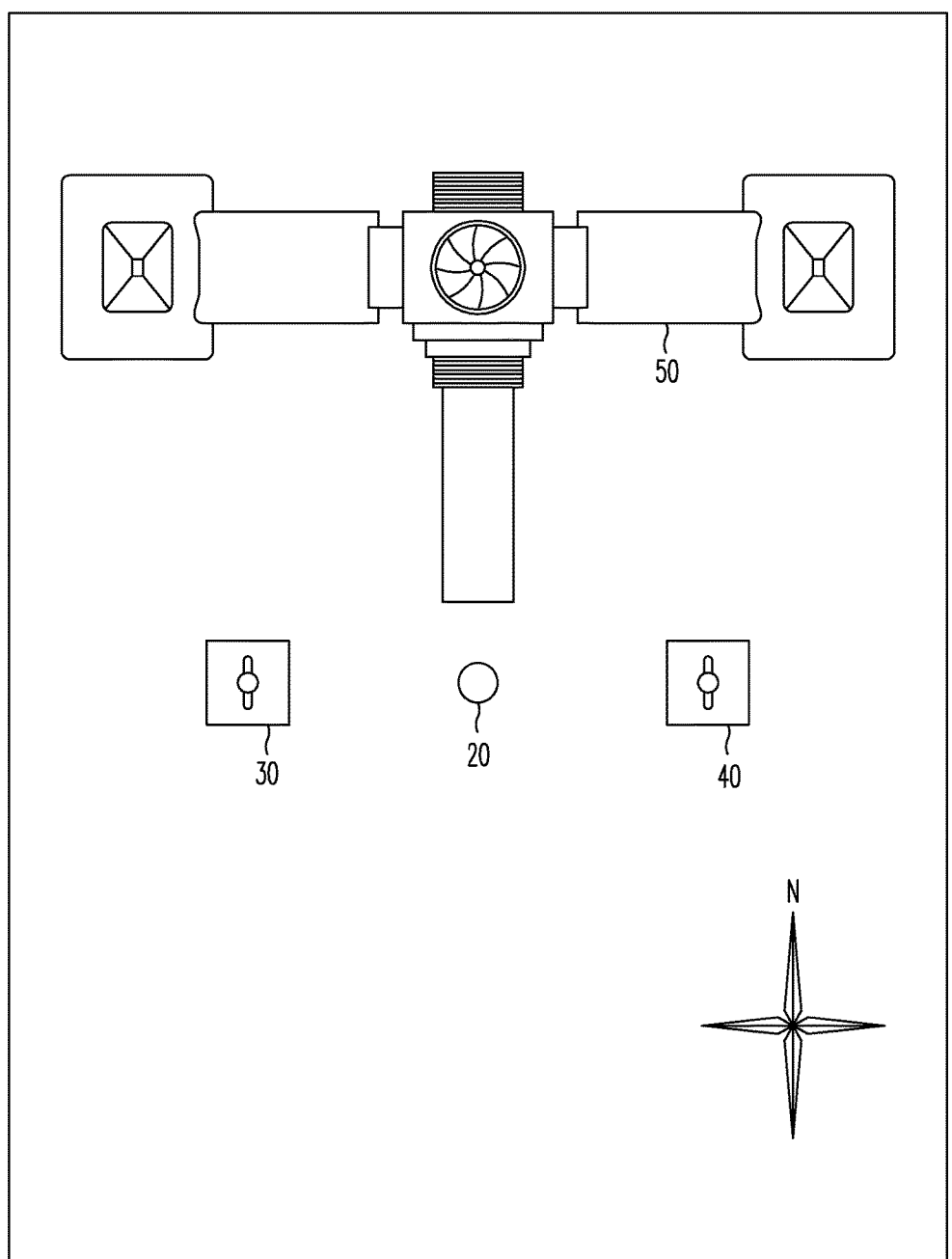
FIG. 1 is a simplified block diagram illustrating use of compass orientation by an electronic device such as a digital still camera.

FIG. 1 is a simplified block diagram illustrating use of compass orientation by an electronic device such as a digital still camera. In a geographic area 10, an observer 20 is in position to take photographs of objects such as statue 30, statue 40, and building 50. A GPS sensor in the digital still camera can provide data related to where observer 20 is standing, but cannot provide information as to what the observer is facing for the photograph. An electronic compass, including, for example, a magnetometer and an accelerometer, within the digital still camera can provide additional data as to the orientation of the digital still camera with respect to a global frame of reference (e.g., magnetic north or other coordinate frames of reference). This information, along with the GPS information, can be stored with the photograph data. During photo processing, for example, the GPS and orientation information can be used, in conjunction with map information, to determine the direction that the camera was facing when the photograph was taken. This direction information can then be associated with the displayed image and provided in any way desired by the application or the user (e.g., to identify stationary objects displayed in the image).

Figure 2:
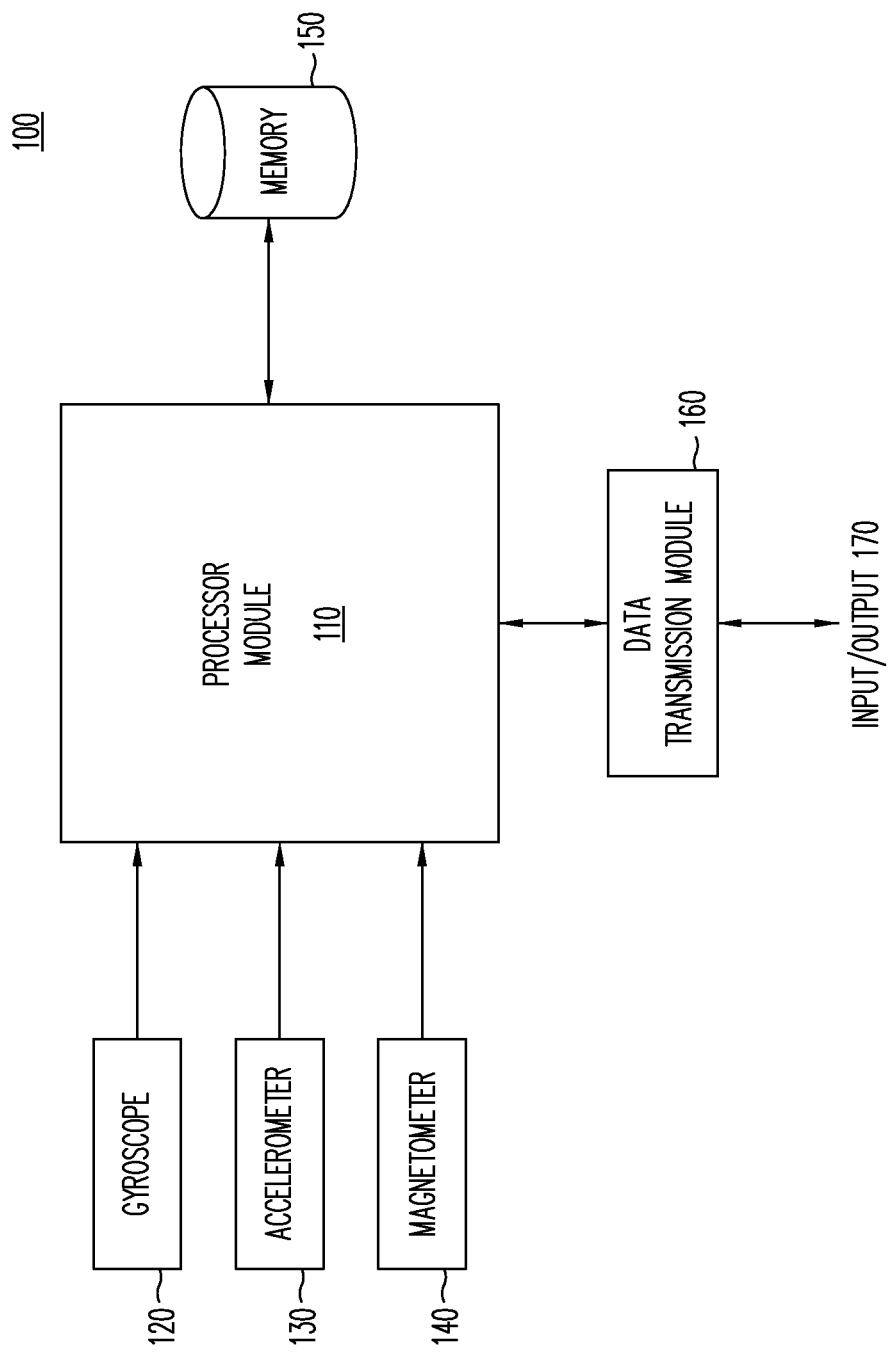
FIG. 2 is a simplified block diagram illustrating components of an example of a sensor device package usable with embodiments of the present invention.

FIG. 2 is a simplified block diagram illustrating components of an example of a sensor device package usable with embodiments of the present invention. The example sensor device package 100 includes a processor module 110 communicatively coupled to an XYZ MEMS gyroscope 120, an XYZ accelerometer 130, and an XYZ magnetometer 140. As will be discussed in more detail below, each sensor can actually incorporate three sub sensors oriented orthogonally.

Signals from each of the orthogonal sensors in the gyroscope, accelerometer, and magnetometer are provided to the processor module for interpretation. Sensor device package 100 also includes a memory 150 coupled to processor module 110, which can store at least calibration information for the variety of sensors. Processor module 110 is also communicatively coupled to a data transmission module 160 that can input and output signals 170 to a receiver and/or transmitter external to sensor device package 100. Alternative examples of sensor device packages may not have an incorporated processor module, and instead will communicate sensor signals to an external processor module or controller. It should be noted that the modules incorporated in sensor device package 100 are provided by way of example, and that embodiments of the present invention are not limited by the modules actually incorporated within the sensor device package.

Each sensor device package and sensors within that package can have characteristics that cause that particular sensor device package to differ in performance from an optimal sensor device package. For example, package stresses can differ from sensor device package to sensor device package and can affect MEMS-based sensors. Also, temperature changes can alter device electrical characteristics. To compensate for these differences, calibration information relating how that sensor differs from optimal can be stored and used by the processor module in the sensor device package. In the configuration illustrated in FIG. 2, such calibration, or trim, information is stored in memory 150. This calibration information can be generated by the manufacturer during testing of the sensor device package prior to shipping the package to customers, and can subsequently be updated using the mechanisms provided by embodiments of the present invention.

Figure 3:
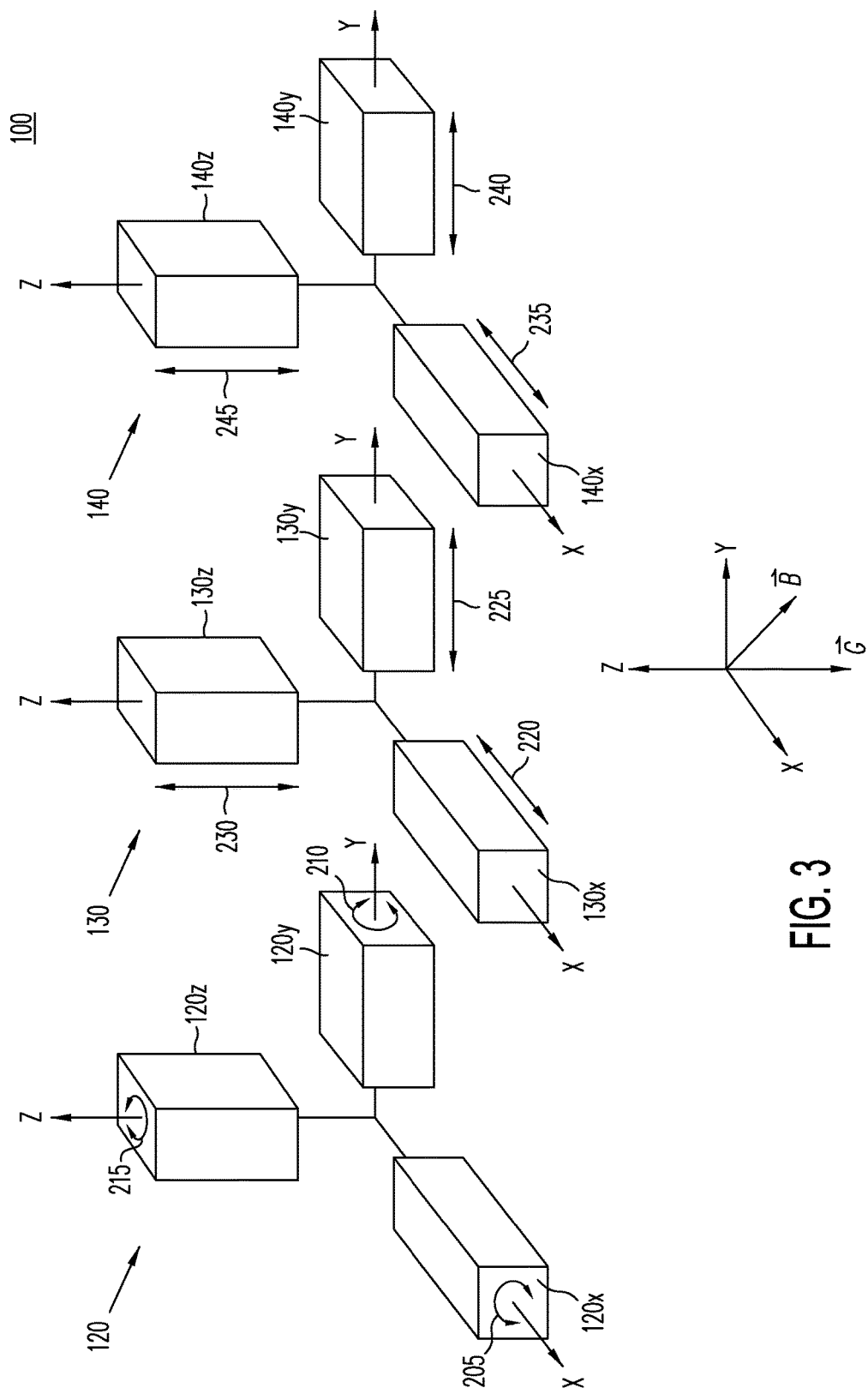
FIG. 3 is a simplified block diagram illustrating a perspective view of a three-axis sensor configuration for gyroscopes, accelerometers, and magnetometers of a system incorporating embodiments of the present invention.

FIG. 3 is a simplified block diagram illustrating a perspective view of a three-axis sensor configuration for each of gyroscopes, accelerometers, and magnetometers of a system incorporating embodiments of the present invention. In the illustrated embodiment, three gyroscopes (120$x$, 120$y$, and 120$z$) are orthogonally mounted in sensor package 100. Three orthogonally-mounted accelerometers (130$x$, 130$y$, 130$z$) and three orthogonally-mounted magnetometers (140$x$, 140$y$, 140$z$) are also mounted in the sensor package 100. It should be understood that other embodiments can include additional directionally-sensitive sensor devices, either more sensors of the same types illustrated or sensitive to different directional forces. Although the embodiment illustrated in FIG. 3 provides each of gyroscope 120, accelerometer 130, and magnetometer 140 mounted along the same orthogonal axes, it should be understood that the various sensors can be mounted in independent orientations as long as the relationship between the variety of orientations is known.

Gyroscopes 120$x$, 120$y$, 120$z$ are configured to sense rotation about the x-axis, the y-axis, and the z-axis respectively (illustrated by arrows 205, 210, and 215, respectively). Accelerometers 130$x$, 130$y$, 130$z$ are configured to sense a linear acceleration along the x-axis, the y-axis, and the z-axis, respectively (illustrated by arrows 220, 225, and 230, respectively). Finally, magnetometers 140$x$, 140$y$, 140$z$ are configured to sense orientation of a magnetic field in relation to the x-axis, the y-axis, and the z-axis, respectively (illustrated by arrows 235, 240, and 245, respectively). A gravity vector G and a magnetic field vector B, for example, can be determined from the accelerometers and the magnetometers. For purposes of embodiments of the present invention, a constant direction magnetic field (e.g., Earth magnetic north) is assumed so that it is known that during a rotation of system 100, the vectors being measured are constant in both absolute direction and magnitude.

Accelerometers and magnetometers can be used to measure rotation of the system with respect to two constant independent vectors—G (Earth's gravitational field) and B (Earth's magnetic field). A measured rotation vector can then be determined from measurements related to rotations about these known vectors and derivatives of those measurements (e.g., measurements taken at different times). The measured rotation vector determined by these measurements, along with an observed rotation vector from the gyroscope, can be used for a variety of purposes, including calculating trim values for the gyroscope (e.g., bias and gain compensation values).

Accelerometers 130 and magnetometers 140 are affected by rotation of sensor system 100 in a predictable manner. The magnitude of G and B should not change, since the Earth's gravitational and magnetic fields are locally constant, so long as linear acceleration and magnetic interference are both zero. But the direction of those vectors, in the sensor's frame of reference, should change, provided that the rotation is about an axis not co-linear with the magnetometer or accelerometer. Based upon the rotation, a common rotation can be determined from the changes in direction sensed by the accelerometers and magnetometers.

Figure 4:
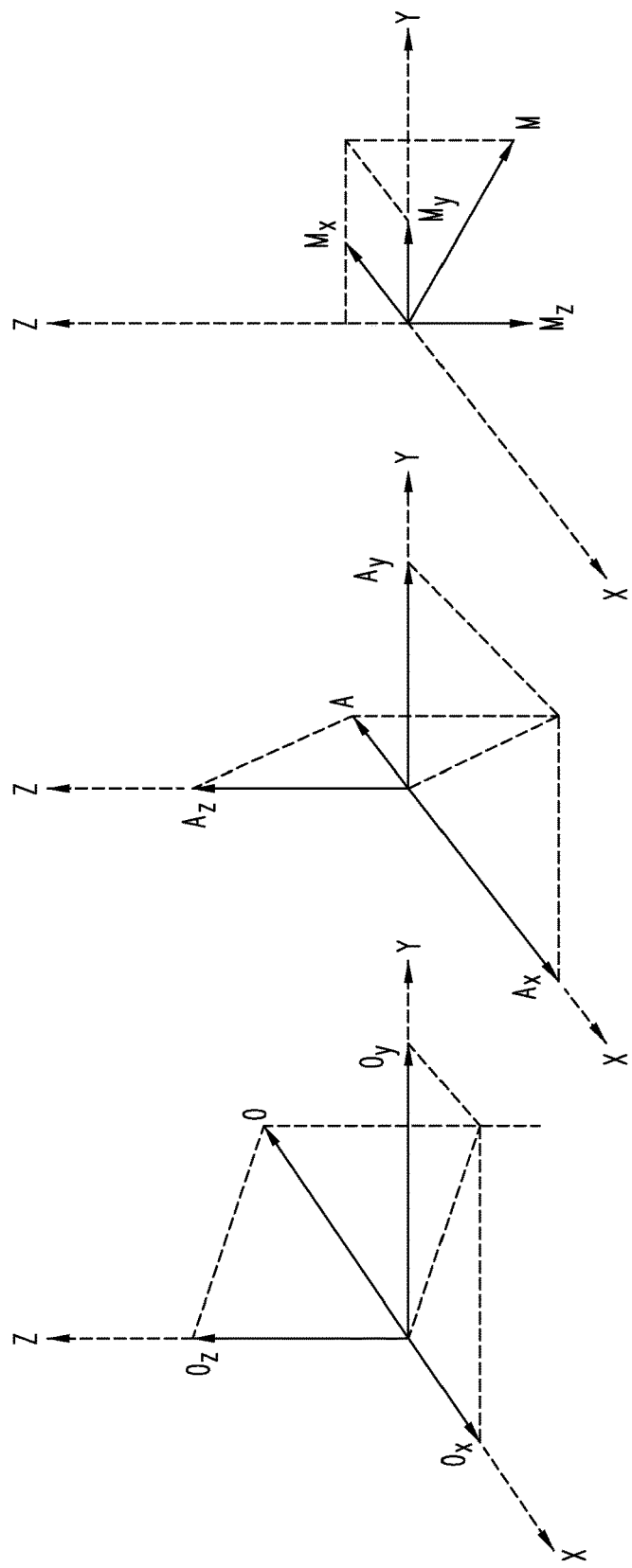
FIG. 4 is a simplified block diagram illustrating an observed rotation vector and two independent vectors.

FIG. 4 is a simplified block diagram illustrating an observed rotation vector O and two vectors A (associated with accelerometers 130) and M (associated with magnetometers 140). The observed gyroscope rotation vector O includes an x-axis component Ox, a y-axis component Oy, and a z-axis component Oz. The first vector A (measured by the accelerometer) includes an x-axis component Ax, a y-axis component Ay, and a z-axis component Az. The independent vector M (measured by the magnetometer) includes an x-axis component Mx, a y-axis component Ay, and a z-axis component Mz.

From a set of measurements obtained from accelerometers 130 and magnetometers 140, along with observed measurements from gyroscopes 120, correlation can be performed to relate the rotational rate of change measured with respect to the independent vectors of the accelerometer and magnetometer with the observed gyroscope rotation vector O. A number of mathematical methods known in the art can be performed to achieve the desired rotational vector estimates from the accelerometer and magnetometer outputs (e.g., a solution to Wahba's problem). Then these rotational vector estimates can be correlated with the gyroscope outputs.

In practice, one could configure a system to determine orientation in three different timing scenarios. At a first time, when there is no electromagnetic interference, orientation of the system can be determined using only data generated by the accelerometer and the magnetometer. At a second time (subsequent to the first), orientation can still be determined using the accelerometer and magnetometer, but a gyroscope can be activated so that observed gyroscope angular rates can be correlated with the rotational rate of change observed from the accelerometer and magnetometer. Finally, at a third time (subsequent to the second) when electromagnetic interference is present, the orientation from the second time can be used as a starting point, and the correlated gyroscope angular rates can be used to rotate the starting point accelerometer and/or magnetometer data.

Figure 5:
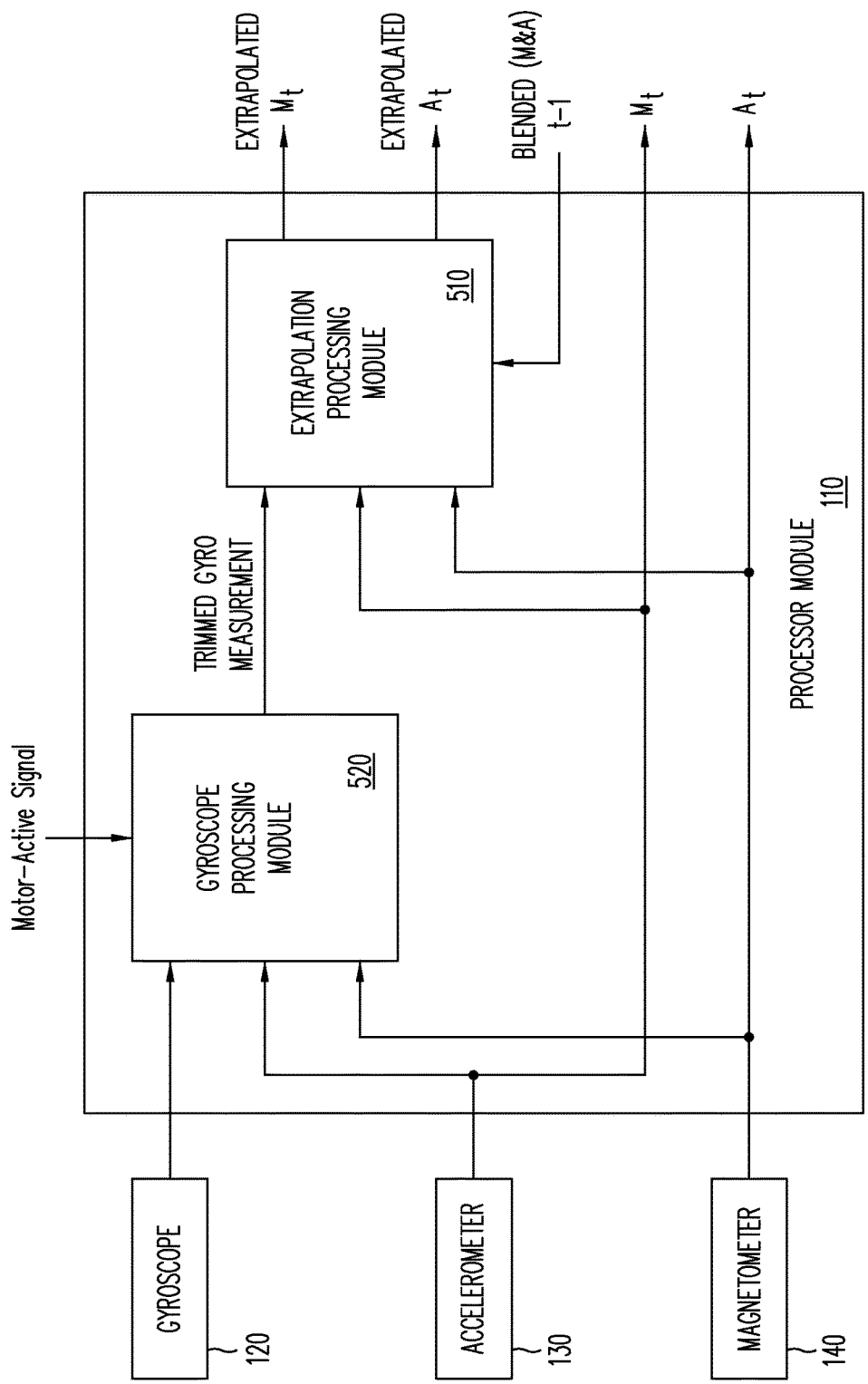
FIG. 5 is a simplified block diagram illustrating an example of a system configured to utilize the information generated by a sensor suite incorporating an accelerometer, magnetometer, and gyroscope to provide a gyroscope stabilized estimate of orientation.

FIG. 5 is a simplified block diagram illustrating an example of a system configured to utilize the information generated by a sensor suite incorporating an accelerometer, magnetometer, and gyroscope to provide gyroscope stabilized estimates of acceleration and magnetic field. These estimates can be used at times when magnetometer values are in question (e.g., when EMI is occurring subsequent to a last good value from the magnetometer). Processor module 110, among other things, provides an extrapolation processing module 510 coupled to receive output signals from a gyroscope processing module 520 as well as from accelerometer 130 and magnetometer 140. Gyroscope processing module 520 provides trimmed values of gyroscope measurements, as calculated from one or more of gyroscope data, accelerometer data, and magnetometer data. As will be discussed in greater detail below, a MOTOR_IS_ACTIVE signal can be sent by the camera focus control, or another module coupled to the shutter button, to the gyroscope processing module to avoid erroneous magnetometer data. Blended values for the gravity and magnetic vectors at time t−1 (A(t−1) and M(t−1), respectively) can be used by extrapolation processing module 510 in conjunction with the trimmed gyroscope values for angular velocity to compute "gyro stabilized" values of gravity and magnetic vectors at time t (e.g., the "third time" discussed above, wherein the time t−1 corresponds to the "second time" discussed above). Since these values are based solely upon past (i.e., known) values from the magnetometer and accelerometer, they are independent of linear acceleration and magnetic interference for at least an initial time t. In order to avoid errors that may accumulate after the initial time t, mixing of extrapolated and measured values over time can be used to the extent such measured values are available. A sensor fusion system, such as that incorporated in FIG. 5, illustrates how base functionality (e.g., measurement of device orientation) can be provided even when one of the sensors specifically provided for that functionality (e.g., a magnetometer) is no longer operable, or the values from that sensor can be checked by referring to other sensors in the system.

Figure 6:
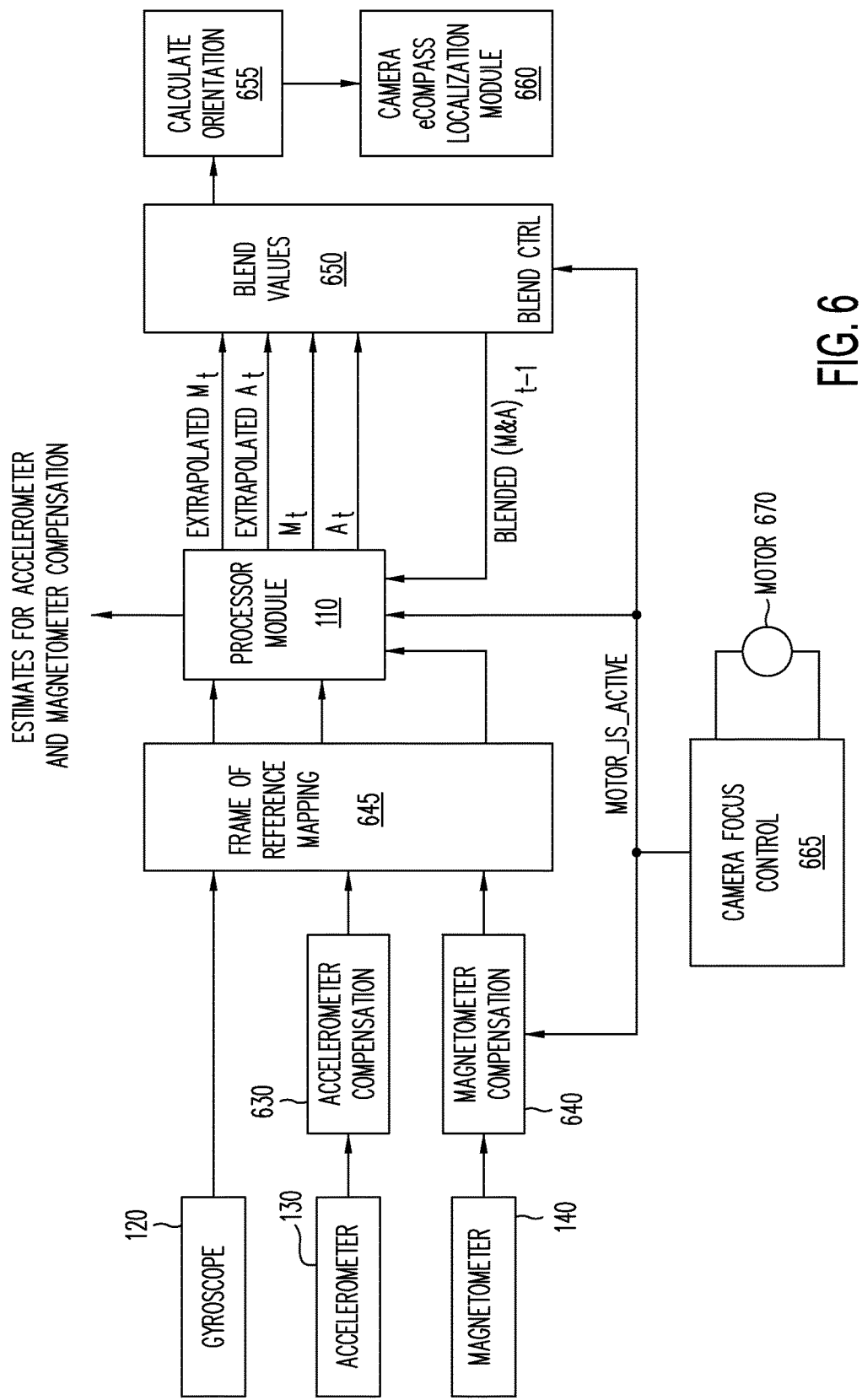
FIG. 6 is a simplified block diagram illustrating an incorporation of the gyro stabilized estimate of orientation mechanism of FIG. 5 into a digital still camera, in accord with embodiments of the present invention.

FIG. 6 is a simplified block diagram illustrating an incorporation of the gyro stabilized estimates of magnetic field and gravity of FIG. 5 into a digital still camera, in accord with embodiments of the present invention. Although a specific example of a digital still camera is discussed with regard to the figures, it should be recognized that other devices can incorporate embodiments of the present invention to generate orientation data in the presence of EMI, and thus the present invention is not limited to digital still camera applications. As in FIG. 5, processor module 110 accepts input data from gyroscope 120, accelerometer 130, and magnetometer 140. Compensation can be provided for the accelerometer or the magnetometer, if needed, using accelerometer compensation module 630 and magnetometer compensation module 640. The sensor values, or the compensated values for the sensors, are provided to a frame of reference mapping module 645. Frame of reference mapping module 645 aligns the raw sensor values with a common global frame of reference for the device. The aligned sensor data is then provided to processor module 110, as discussed above with regard to FIG. 5.

As discussed above, time (t−1) gravity and magnetic vectors (e.g., Blended (M&A)$_{(t-1)}$) can be used in conjunction with gyroscope values for angular velocity to compute gyro-stabilized values for the gravity and magnetic vectors at a subsequent time t, as needed. These values are provided to a blend values module 650, which can calculate an estimated magnetic vector, for example, using a compensated magnetic reading from the magnetometer and a gyro-compensated magnetic vector generated by processor module 110. As will be discussed in further detail below, the blend values module responds to an indication of whether there is an EMI generated in response to a user command that can cause potentially erroneous magnetometer values from being generated.

The estimated magnetic vector, accelerometer vector, and observed rotation vector are provided to an orientation calculation module 655. Orientation calculation module 655 uses the data to determine the orientation of the camera with regard to the global frame of reference. Since the data used can include gyro-compensated values for the estimated magnetic vector, the calculated orientation will be correct regardless of any electromagnetic interference generated by the device in response to user control. The orientation data is then provided to a localization module 660. In some embodiments, localization module 660 can interpret the orientation data in light of GPS data to record an accurate compass orientation of the camera in light of local magnetic fluctuations.

As discussed above, gyro-compensated values are used in response to a user input that can result in generation of EMI. Camera focus control 665 responds to a user input to take a picture (e.g., pushing the shutter button). In response to such an input, the camera's automatically focusing lens focuses using a motor 670. Motor 670 can cause the EMI that will in turn cause potentially erroneous data generated by magnetometer 140. In order for the system to respond to the input, a MOTOR_IS_ACTIVE signal can be sent by the camera focus control, or another module coupled to the shutter button, to gyroscope processing module 520 and blend values module 650. In response to this signal, both modules can begin steps necessary to avoid erroneous data being propagated by the magnetometer. In order for a last accurate orientation value from the magnetometer to be available for subsequent calculation, it is desirable to use or capture the last accurate value prior to generation of the EMI. In the case of a digital still camera, the EMI onset is well understood to be a feature of the depression of the shutter button. Therefore, this knowledge can be utilized to take measures before the EMI onset.

Blend values module 650 is configured to mix magnetometer and accelerometer readings with gyro-compensated magnetometer readings, in response to the MOTOR_IS_ACTIVE signal. In normal operation of a digital still camera, the most common state for the system will be that the focus motor is not active. During such periods, the estimated magnetic vector is a mix of the gyro-compensated magnetic vector and the compensated magnetic vector, according to a formula such as:

Estimated Magnetic Vector=(1−α)*Gyro-Compensated Magnetic Vector+α*Compensated Magnetic Vector When the motor is active, the estimated magnetic vector will be the gyro-compensated magnetic vector alone, since the compensated magnetic vector will be potentially erroneous data.

One goal of embodiments of the present invention is to improve battery life of the device requiring orientation data compensation, by not running the gyroscope constantly. Instead, it is desirable to only engage the gyroscope when it is needed. Thus, the above calculation for Estimated Magnetic Vector during periods when the motor is not active will be the Compensated Magnetic Vector, unless there is a period when the gyroscope is active and the motor is not active. Such a period can occur if a control signal, warning that a focus motor is about to become active, is provided shortly before the motor becomes active. At that time, a fast gyroscope can be activated in order to provide a gyro-compensated magnetic vector transition period, during which the above formula is used. One alternative to having a fast gyroscope is to have a gyroscope active all the time, but this carries with it the undesirable consumption of battery resources. It is desirable to have the gyroscope active at a time when the magnetometer is still generating good data because the rotation calculations will use the last good value from the magnetometer as a starting point for the succeeding Estimated Magnetic Vector calculations.

In order to avoid some of the undesirable consequences of having an independent gyroscope active constantly to do the gyro-compensated magnetic vector calculations, an existing gyroscope in the camera can be used. For example, many cameras have image stabilization circuitry, which uses a gyroscope sensor to provide the stabilized images. Signals from that gyroscope sensor can be used to provide the data necessary for the gyro-compensated magnetic vector as well.

The control signal discussed above provides a dual purpose. As discussed above, the control signal can be used to activate a fast gyroscope so that power is conserved. The control signal also functions as a warning that the focus motor is about to be activated, and that therefore there will be EMI. The control signal can be generated in a number of ways. For example, the control signal can be generated upon depression of the shutter button. A delay can be built into the system so that the focus motor is not activated for a defined period of time that is sufficient to activate the gyroscope and generate gyro-compensated magnetic vector values. One negative of such a method of activating the gyroscope is that it will delay the focusing and taking of a picture.

An alternative mechanism for generating the control signal is in reaction to any movement of the digital still camera. The accelerometer can detect any movement of the camera. In response to an accelerometer reading, the control signal can be generated and the gyroscope activated. Once again, at this time the magnetometer will be generating good data that will provide an accurate starting point for gyroscope aided extrapolating.

In some instances, it may not be possible to configure the gyroscope such that it will activate prior to the generation of bad data from the magnetometer. One solution to the need to have a good starting point from which to extrapolate the rotation using the gyroscope, is to periodically buffer the magnetometer data. In this manner, a last accurate value of magnetometer data can be used as the starting point once the gyroscope has activated. For example, a last second's worth of magnetometer data can be buffered at every $1/20^{th}$ of a second. Once EMI is present, the orientation before the EMI can be found in the buffer and used for gyroscope extrapolation of the Estimated Magnetic Vector. In this instance, the control signal can be the motor start signal. In other instances, if such a motor start signal is not available to the orientation system, a detection of EMI by the magnetometer can be interpreted and the buffered data used as the orientation starting point.

Figure 7:
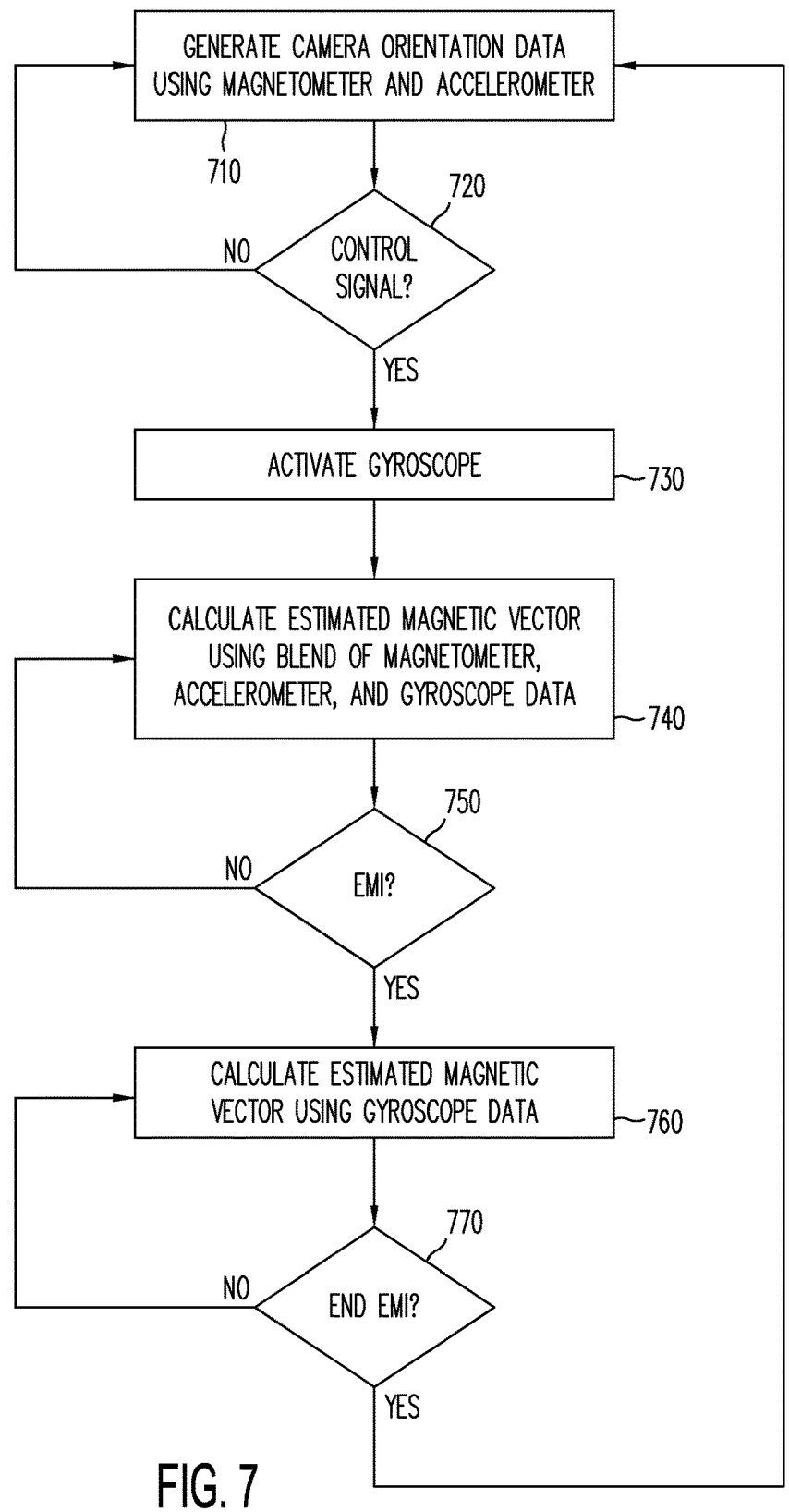
FIG. 7 is a simplified flow diagram illustrating an example of a method usable by embodiments of the present invention to generate camera orientation data.

FIG. 7 is a simplified flow diagram illustrating an example of a method usable by embodiments of the present invention to generate camera orientation data. During normal operation prior to receipt of any control signal, camera orientation data can be generated using a combination of a magnetometer 140 and accelerometer 130, as needed for the application (710). If a control signal is received indicating the initiation of activities that can generate EMI (720), a gyroscope (e.g., 120) can be activated (730).

Once the gyroscope is active, the gyroscope data can be used in conjunction with prior magnetometer data to generate an Estimated Magnetic Vector (740), thereby correlating the measured accelerometer and magnetometer data with the gyroscope data. The blending of magnetometer data and extrapolated data can be governed by an equation such as that discussed above with regard to FIG. 6. Use of gyroscope and, optionally, accelerometer data to calculate estimated magnetometer data can be performed using a variety of rotational conversion methods known in the art. The blended calculation of the Estimated Magnetic Vector can continue until EMI is present (750), at which point the Estimated Magnetic Vector is calculated using the gyroscope data alone (760). At this point, the Estimated Magnetic Vector is extrapolated using the gyroscope data from a starting point at the last reliable data point from the magnetometer. Extrapolation of the Estimated Magnetic Vector can continue until there is an indication that EMI is no longer present to affect the magnetometer data (770).

Embodiments of the present invention provide a mechanism by which orientation of a device containing a sensor suite can continue to be generated even in the presence of device generated electromagnetic interference. The use of gyroscope angular rotation data can be used to extrapolate orientation with regard to a global frame of reference when magnetometer data is rendered unreliable. Embodiments provide such functionality by using gyroscope data in combination with magnetometer data prior to generation of EMI, or by using magnetometer data generated prior to generation of EMI. Further, embodiments can activate the gyroscope only in response to imminent generation of EMI. In this manner, compass orientation of the device can continue to be generated without the consumption of significant battery resources by continuous operation of the gyroscope.

By now it should be appreciated that there has been provided a system that includes a first set of directionally-sensitive sensors, a second set of directionally-sensitive sensors, a set of gyroscope sensors, and a processor coupled to the first and second sets of directionally-sensitive sensors and the gyroscope sensors. The first set of directionally-sensitive sensors includes three orthogonally-oriented sensors configured to respond to a magnetic field. The second set of directionally-sensitive sensors includes three orthogonally-oriented sensors configured to respond to a constant acceleration. The set of gyroscope sensors includes three sensors oriented on orthogonally-oriented axes each configured to respond to rotation about a corresponding axis. The processor is configured to determine a first orientation of the system with respect to a global frame of reference using signals received from the first and second sets of directionally-sensitive sensors at a first time. The processor is also configured to determine a second orientation of the system with respect to the global frame of reference at a second time, using second signals received from the first and second sets of directionally-sensitive sensors, and correlating an observed angular rate of change of the system from first gyroscope signals from the set of gyroscope sensors during a period between the first time and the second time to the rotational change reflected by the first and second signals received from the directionally-sensitive sensors. The processor is further configured to determine a third orientation of the system with respect to the global frame of reference using the second orientation, and one or more of third signals received from the first and second sets of directionally-sensitive sensors at a third time and an observed angular rate of change of the system using second gyroscope signals from the set of gyroscope sensors during a period between the second time and the third time, wherein said determining the second and third orientation is performed in response to receiving a control signal.

In one aspect of the above embodiment, the control signal precedes generation of an electromagnetic interference by a component of the system. A further aspect includes a user input device configured to receive a user input and to generate the control signal in response to the user input. A still further aspect includes an electric motor that is configured to respond to the user input wherein the response of the motor generates the electromagnetic interference. In another aspect, the set of gyroscope sensors is configured to activate in response to receiving the control signal.

In another aspect, the processor is further configured to determine a fourth orientation of the system with respect to the global frame of reference at a fourth time using the third orientation and an observed angular rate of change of the system using third signals from the set of gyroscope sensors during a period between the third time and the fourth time. In another aspect the electromagnetic interference generated by a component of the system is initiated between the second time and the third time in response to the control signal. A further aspect includes an electric motor configured to respond to the user input wherein the response of the motor generates the electromagnetic interference. A yet further aspect provides a digital still camera including the system, wherein the electric motor is configured to focus an optical lens and the control signal is generated by a user input device configured to receive a user input. In still a further aspect, the digital still camera includes an image stabilization gyroscope that includes the set of gyroscopic sensors. In another further aspect, the digital still camera includes a memory configured to periodically store signals received from the first set of directionally-sensitive sensors in a set of buffer registers, and the processor is further configured to access the stored signals at the third time to provide the third signals.

In another aspect, the second set of directionally-sensitive sensors are configured to generate the control signal in response to a motion of the system. In still another aspect, the set of gyroscopic sensors is configured for constant operation.

Another embodiment of the present invention provides a method implemented by a digital still camera, where the method includes: determining a first orientation of the digital still camera with respect to a global frame of reference, at a first time, using data generated by a first set of directionally-sensitive sensors and a second set of directionally-sensitive sensors; determining a second orientation of the digital still camera with respect to the global frame of reference at a second time using the second data generated by the first and second sets of directionally-sensitive sensors at the second time; correlating a first observed angular rate of change of the digital still camera generated by a set of gyroscope sensors during a period between the first time and the second time to the rotational change reflected by the first and second orientation; and, determining a third orientation of the digital still camera with respect to the global frame of reference at a third time using the second orientation, and one or more of data generated by the first and second sets of directionally-sensitive sensors at the third time, and a second observed angular rate of change of the digital still camera generated by the set of gyroscope sensors during a period between the second and third time. The first set of directionally-sensitive sensors includes three orthogonally-oriented sensors configured to respond to a constant magnetic field. The second set of directionally-sensitive sensors includes three orthogonally-oriented sensors configured to respond to a constant acceleration. The set of gyroscope sensors includes three sensors on orthogonally-oriented axes configured to respond to rotation about a corresponding axis. Determining the second and third orientation is performed in response to a control signal.

In one aspect of the above embodiment, the method further includes generating the control signal prior to generating electromagnetic interference by a component of the digital still camera. In a further aspect, generating the control signal is performed in response to a user input. In still a further aspect, the response to user input includes activating a shutter button of the digital still camera.

In another aspect, the method further includes determining a fourth orientation of the digital still camera with respect to the global frame of reference at a fourth time using the third orientation and an observed angular rate of change of the digital still camera using a third set of data from the set of gyroscope sensors during a period between the third time and the fourth time. In another aspect, the method includes activating a lens focus motor in response to generating the control signal, where activating the lens focus motor generates electromagnetic interference and the activating is initiated between the second time and the third time.

In another aspect, the method further includes activating the set of gyroscope sensors in response to the control signal. In another aspect, the method further includes activating the set of gyroscope sensors in response to a signal generated by the first or second set of directionally-sensitive sensors.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Some of the above embodiments, as applicable, may be implemented using a variety of different information processing systems. For example, although FIG. 6 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 600 are circuitry located on a single integrated circuit or within a same device. Alternatively, system 600 may include any number of separate integrated circuits or separate devices interconnected with each other. For example, processor module 110 may be located on a same integrated circuit as camera focus control 665 or on a separate integrated circuit or located within another peripheral or slave discretely separate from other elements of system 600. Also for example, portions thereof may be soft or code representations of physical circuitry or of logical representations convertible into physical circuitry. As such, system 600 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
a component capable of generating electromagnetic interference;
a first set of directionally-sensitive sensors, wherein
the first set of directionally-sensitive sensors comprises three orthogonally-oriented sensors configured to respond to a magnetic field, and
the first set of directionally-sensitive sensors are mounted within range of the electromagnetic interference wherein generation of the electromagnetic interference causes the first set of directionally-sensitive sensors to generate erroneous data related to the magnetic field;
a second set of directionally-sensitive sensors, wherein
the second set of directionally-sensitive sensors comprises three orthogonally-oriented sensors configured to respond to a constant acceleration, and
the second set of directionally-sensitive sensors are mounted in a fixed orientation to the first set of directionally-sensitive sensors;
a set of gyroscope sensors, wherein
the set of gyroscope sensors comprises three sensors oriented on orthogonally-oriented axes each configured to respond to rotation about a corresponding axis, and
the set of gyroscope sensors are mounted in a fixed orientation to the first and second sets of directionally-sensitive sensors;
a processor, coupled to the first and second set of directionally sensitive sensors and the set of gyroscope sensors, and configured to
determine a first orientation of the system with respect to a global frame of reference using first signals received from the first and second sets of directionally-sensitive sensors at a first time, and
determine a second orientation of the system with respect to the global frame of reference at a second time, using second signals received from the first and second sets of directionally-sensitive sensors, and correlating an observed angular rate of change of the system from first gyroscope signals from the set of gyroscope sensors during a period between the first time and the second time to the rotational change reflected by the first and second signals received from the directionally-sensitive sensors;
determine a third orientation of the system with respect to the global frame of reference using the second orientation, and one or more of third signals received from the first and second sets of directionally-sensitive sensors at a third time and an observed angular rate of change of the system using second gyroscope signals from the set of gyroscope sensors during a period between the second time and the third time, wherein said determining the second and third orientation is performed in response to receiving a control signal.

2. The system of claim 1, wherein the control signal precedes generation of an electromagnetic interference by the component of the system and the third orientation of the system is determined using the second gyroscope signals.

3. The system of claim 2 further comprising:
a user input device configured to receive a user input and to generate the control signal in response to the user input.

4. The system of claim 3 further comprising:
an electric motor configured to respond to the user input, wherein
the response of the motor generates the electromagnetic interference, and
the component comprises the motor.

5. The system of claim 2 wherein the set of gyroscope sensors is configured to activate in response to receiving the control signal.

6. The system of claim 2, wherein
the processor is further configured to determine a fourth orientation of the system with respect to the global frame of reference at a fourth time using the third orientation and an observed angular rate of change of the system using third gyroscope signals from the set of gyroscope sensors during a period between the third time and the fourth time.

7. The system of claim 1 wherein the electromagnetic interference generated by the component of the system is initiated between the second time and the third time in response to the control signal.

8. The system of claim 7 further comprising:
an electric motor configured to respond to the user input, wherein the response of the motor generates the electromagnetic interference.

9. A digital still camera comprising the system of claim 8, wherein
the electric motor is configured to focus an optical lens, and
the control signal is generated by a user input device configured to receive a user input.

10. The digital still camera of claim 9 further comprising:
an image stabilization gyroscope comprising the set of gyroscope sensors.

11. The digital still camera of claim 9 further comprising:
a memory, coupled to the processor and the first set of directionally-sensitive sensors, and configured to periodically store signals received from the first set of directionally-sensitive sensors in a set of buffer registers; and
the processor further configured to access the stored signals at the third time to provide the third signals.

12. The system of claim 2 further comprising:
the second set of directionally-sensitive sensors are configured to generate the control signal in response to a motion of the system.

13. The system of claim 2 wherein the set of gyroscope sensors is configured for constant operation.

14. A method implemented by a digital still camera, the method comprising:
determining a first orientation of the digital still camera with respect to a global frame of reference at a first time using first data generated by a first set of directionally-sensitive sensors and a second set of directionally-sensitive sensors, wherein
the first set of directionally-sensitive sensors comprises three orthogonally-oriented sensors configured to respond to a constant magnetic field,
the first set of directionally-sensitive sensors are mounted on or near a lens comprising a motor capable of generating electromagnetic interference sufficient to cause the first set of directionally-sensitive sensors to generate erroneous data related to the constant magnetic field, and
the second set of directionally-sensitive sensors comprises three orthogonally-oriented sensors configured to respond to a constant acceleration and are mounted in a fixed orientation to the first set of directionally-sensitive sensors;
determining a second orientation of the digital still camera with respect to the global frame of reference at a second time using the first orientation and second data generated by the first and second sets of directionally-sensitive sensors at the second time;
correlating a first observed angular rate of change of the digital still camera generated by a set of gyroscope sensors during a period between the first time and the second time to the rotational change reflected by the first and second orientation, wherein
the set of gyroscope sensors comprises three sensors on orthogonally-oriented axes configured to respond to rotation about a corresponding axis,
the set of gyroscope sensors are mounted in a fixed orientation to the first and second sets of directionally-sensitive sensors and
said correlating is performed in response to a control signal; and
determining a third orientation of the digital still camera with respect to the global frame of reference at a third time using the second orientation, and one or more of data generated by the first and second sets of directionally sensitive sensors at the third time and a second observed angular rate of change of the digital still camera generated by the set of gyroscope sensors during a period between the second time and the third time.

15. The method of claim 14 further comprising:
generating the control signal prior to generating electromagnetic interference by the lens motor of the digital still camera.

16. The method of claim 15 wherein said generating the control signal is performed in response to a user input.

17. The method of claim 16 wherein the response to user input comprises activating a shutter button of the digital still camera.

18. The method of claim 15 further comprising:
determining a fourth orientation of the digital still camera with respect to the global frame of reference at a fourth time using the third orientation and a third observed angular rate of change of the digital still camera using a third set of data from the set of gyroscope sensors during a period between the third time and the fourth time.

19. The method of claim 14 further comprising:
activating a lens focus motor in response to said generating the control signal, wherein said activating the lens focus motor generates electromagnetic interference and said activating is initiated between the second time and the third time.

20. The method of claim 14 further comprising:
activating the set of gyroscope sensors in response to one of the control signal or a signal generated by the first or second set of directionally-sensitive sensors.

* * * * *